(12) United States Patent
Keck

(10) Patent No.: US 7,210,908 B2
(45) Date of Patent: May 1, 2007

(54) HYDRAULIC MACHINE ROTOR

(75) Inventor: Helmut Keck, Dietlikon (CH)

(73) Assignee: VA Tech Hydro GmbH, Vienna (AT)

( * ) Notice: Subject to any disclaimer, the term of this patent is extended or adjusted under 35 U.S.C. 154(b) by 217 days.

(21) Appl. No.: 11/089,716

(22) Filed: Mar. 25, 2005

(65) Prior Publication Data

US 2005/0214115 A1 Sep. 29, 2005

Related U.S. Application Data

(63) Continuation-in-part of application No. PCT/EP03/09990, filed on Sep. 9, 2003.

(51) Int. Cl.
*F03B 3/12* (2006.01)

(52) U.S. Cl. .................. 416/186 R; 416/203

(58) Field of Classification Search ......... 416/203, 416/186 R, 228, 223 R, DIG. 5
See application file for complete search history.

(56) References Cited

U.S. PATENT DOCUMENTS

| | | | |
|---|---|---|---|
| 3,639,080 A | 2/1972 | Yamabe | |
| 3,918,627 A * | 11/1975 | Kawano et al. | 228/178 |
| 4,479,757 A * | 10/1984 | Holmes et al. | 416/186 R |
| 6,135,716 A * | 10/2000 | Billdal et al. | 416/183 |
| 6,155,783 A | 12/2000 | Beyer | 416/90 |

FOREIGN PATENT DOCUMENTS

| | | |
|---|---|---|
| DE | 19803390 | 2/1999 |
| DE | 19801849 | 7/1999 |
| JP | 511466494 | 12/1976 |
| JP | 2000-054944 | 2/2000 |

OTHER PUBLICATIONS

International Search Report for PCT/EP2003/009990 dated Dec. 2, 2003.

* cited by examiner

*Primary Examiner*—Ninh H. Nguyen
(74) *Attorney, Agent, or Firm*—Nixon & Vanderhye P.C.

(57) ABSTRACT

Rotor blades of a hydraulic machine rotor are shaped such that the inlet edge and outlet edge of two adjacent rotor blades have varying profiles in different sections.

18 Claims, 3 Drawing Sheets

HYDRAULIC MACHINE ROTOR

CROSS-REFERENCE TO RELATED APPLICATION

The present application is a continuation-in-part of PCT/EP2003/009990, filed 9 Sep. 2003, which claims priority of Austrian Application No. A 1147/2002, filed 26 Sep. 2002. The PCT International Application was published in the German language.

BACKGROUND OF THE INVENTION

The present invention relates to a rotor of a hydraulic machine, preferably a Francis turbine, Francis pump-turbine or radial or diagonal pump, with a number of rotor blades which are arranged between an inner and an outer cover disk, and the rotor blades having an inlet edge and an outlet edge.

A rotor of a hydraulic machine, for example, a Francis turbine, is shown in FIG. 4 hereof. It has a plurality of rotor blades 1, each having an inlet edge 4 and an outlet edge 5. The blades 1 are arranged between an inner cover disk 3 and an outer cover disk 2. Two blades 1 forming a flow duct for an operating medium, for example water, and the operating medium flows through the duct during the operation of the hydraulic machine and thus sets the rotor in rotation. The manufacture of such a rotor is highly complicated because of the complex geometric shapes of the rotor blades. In order to allow the manufacture of the rotor, for example by welding, etc., and/or a corresponding machining of the surfaces, for example by grinding, polishing, etc., by means of machine tools, such as, for example, robots, etc., the rotor blades should not lie too closely to one another. Furthermore, when blade regions are closely adjacent to one another, there is always the risk that flushed material will remain caught in the rotor and therefore will be detrimental to operation or may even make it necessary to shut down the hydraulic machine.

On the other hand, a small radius at the inner cover disk is desirable in the region of the outlet edge (=inlet edge in the case of a pump-turbine in pumping mode) of the rotor blades, since this is advantageous for operation, above all at operating points away from the design operating point. In the case of a small radius, for example, vortex formation at the outlet of the rotor would be improved substantially in the part-load ranges.

A large number of blades results in highly confined space conditions at the rotor outlet. On the other hand, a small number of blades results, at the rotor inlet, in wide spacings and high load and cavitation at the rotor inlet.

In order to eliminate this fundamental contradiction, rotors have been manufactured, for example, such that every second or third blade in the entire outlet region of the rotor blades has been designed so as to be shorter than the adjacent rotor blades, what is known as the "splitter blade runner", and the rotor blades in the inlet region have generally been left the same. The advantage of this design is that more space has consequently been provided in the outlet region, thereby essentially eliminating the above disadvantages. However, in this case, the risk of cavitation increases in the region of the outer cover disk between the blade center and outlet edge, since the blade loads increase there because of the partially reduced blade lengths.

U.S. Pat. No. 6,135,716 again discloses a rotor of a Francis turbine, in which the cavitation behavior has been improved in that the inlet and outlet edges of the rotor blades are shaped in a special way with respect to the axis of rotation of the turbine. The lengths of all the rotor blades are in this case left the same and therefore correspond to a conventional rotor. This results, however, once more in the abovementioned disadvantages with regard to manufacture and operation away from the design operation point.

SUMMARY OF THE INVENTION

An object of the present invention is, therefore, to specify a hydraulic machine rotor, in which the abovementioned disadvantages are avoided, but which nevertheless has a good cavitation behavior and does not entail any efficiency losses.

This object is achieved by means of the present invention in that a contact point between the inner cover disk and the inlet edge and/or a contact point between the inner cover disk and the outlet edge of at least one first blade has a larger radius with respect to the axis of rotation of the hydraulic machine than the corresponding contact points of a directly adjacent second blade, the contact points between the outer cover disk and the inlet and outlet edge of the first and the second rotor blade having essentially the same radius.

It is consequently possible, on the one hand, to implement very small radii in the outlet region of the rotor at the inner cover disk, without manufacturing problems or problems due to too narrow a blade arrangement being caused. On the other hand, the load in the regions of high blade load, that is to say in the contact region of the blade with the outer cover disks, is not increased or is increased only insignificantly, since the contact lengths in these regions are not varied, as compared with conventional rotors, so that there is no impairment during operation as regards cavitation.

Hydraulically and in manufacturing terms, it is advantageous if the inlet and outlet edges of a first and a second rotor blade of the rotor are at least partially shaped identically, the edges preferably between the contact point and the outer cover disk and any point on the inlet or outlet edge being shaped identically.

So that the hydraulic machine can be operated frictionlessly, even in part-load ranges, the ratio between the smallest radius of a contact point of the outlet edge with the inner cover disk of a blade and the radius of the contact point of the outlet edge with the outer cover disk of this blade is predetermined to be smaller than or equal to 0.4, preferably smaller than or equal to 0.2. What is achieved thereby is that the outlet vortex from the rotor is reduced and the hydraulic machine can be operated satisfactorily even in part-load ranges.

The number of rotor blades of the rotor is advantageously selected so as to be divisible by two or three, in which case every second or third rotor blade has different inlet and/or outlet edges, thus affording major advantages in manufacturing terms, at least in the region of small radii, since the individual rotor blades can thereby be machined without difficulty.

For hydraulic reasons, it is beneficial to arrange the contact point between the outlet edge and the inner cover disk of at least one blade in the axial direction below the center of the inlet edge of this blade and, in respect of the direction of rotation of the rotor, to arrange the contact points of the inlet and outlet edge with the outer cover disk of at least one blade in front of the corresponding contact points of the inlet and outlet edge with the inner cover disk of this blade. Additional improvements in the hydraulic behavior of the machine arise when, with respect to the axis of rotation of the rotor, the radial spacing between the contact points of the outlet edge with the outer and the inner cover disk of at least one blade is greater than the radial spacing between the contact points of the inlet edge with the outer and the inner cover disk of this blade, advantageously is greater than 10°, preferably greater than 15°. Consequently, inter alia, the cavitation behavior of the hydraulic machine can be improved even further.

If part of at least one rotor blade is arranged on the hub cover and this part is removable together with the hub cover, very small radii of the contact points at the outlet edge with the inner cover disk can be implemented, this, in turn, having a highly advantageous effect in the part-load range of the hydraulic machine.

Other features and advantages of the present invention will become apparent from the following description of the invention which refers to the accompanying drawings.

BRIEF DESCRIPTION OF THE DRAWING

The present invention is described, then, with reference to the following diagrammatic and unrestricted FIGS. 1 to 3 in which.

DETAILED DESCRIPTION OF EMBODIMENTS OF THE INVENTION

Figure 1:
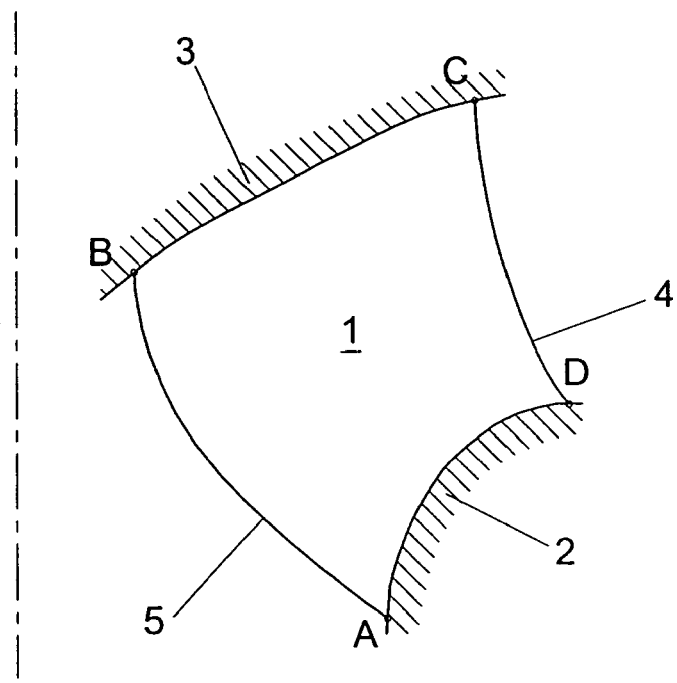
FIG. 1 shows a rotor blade of a conventional rotor of a hydraulic machine.
Figure 4:
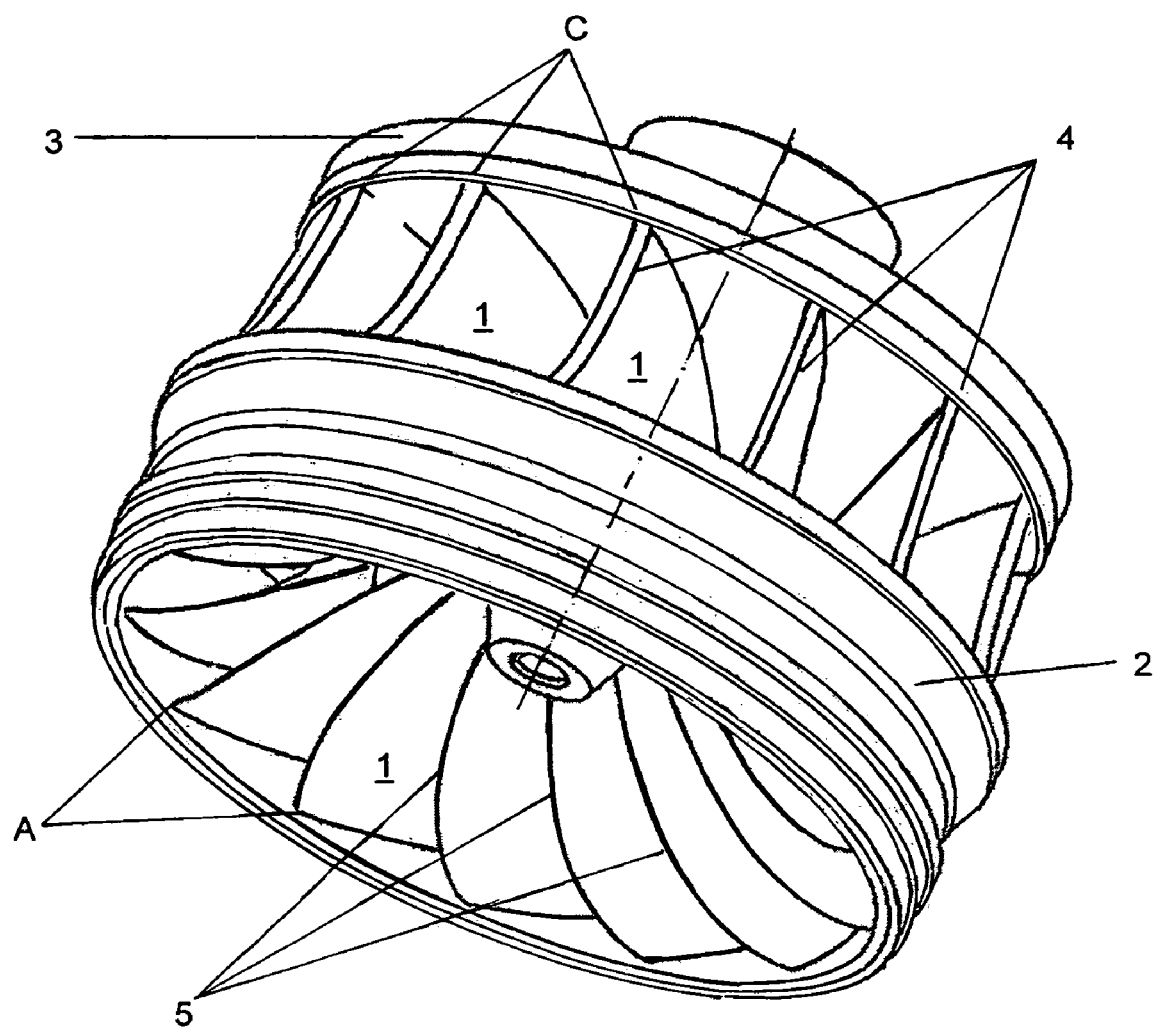
FIG. 4 is a bottom and side perspective view of a conventional rotor in which the rotor blade of the invention may instead be installed.

A conventional rotor blade 1 of a hydraulic machine, e.g. a turbine, pump-turbine or radial pump, is shown in FIG. 1. As shown in FIG. 4, the blade 1 is arranged between an inner 3 cover disk and an outer 2 cover disk. The blade has an inlet edge 4 and an outlet 5 edge which intersect the inner 3 and the outer 2 cover disk at the four contact points A, B, C and D.

Adjacent rotor blades 1 form a flow duct, through which an operating medium, for example water, can flow. For a turbine, a flow would occur from the inlet edge 4, for example from a sufficiently known spiral casing and distributor, not illustrated here, to the outlet edge 5 and, further on, to a sufficiently known suction pipe, likewise not illustrated here, which issues into tail water. For a pump or pump-turbine in pumping mode, the flow direction would be reversed correspondingly, that is, here, from the outlet edge 5 to the inlet edge 4. By means of the flow of operating medium through the rotor, the hydraulic machine is set in rotation (in the case of a turbine) or, as a result of the rotation of the hydraulic machine, operating medium is conveyed (in the case of a pump). The axis of rotation of the hydraulic machine is indicated in FIGS. 1, 2 and 4 by the dashed and dotted line.

Figure 2:
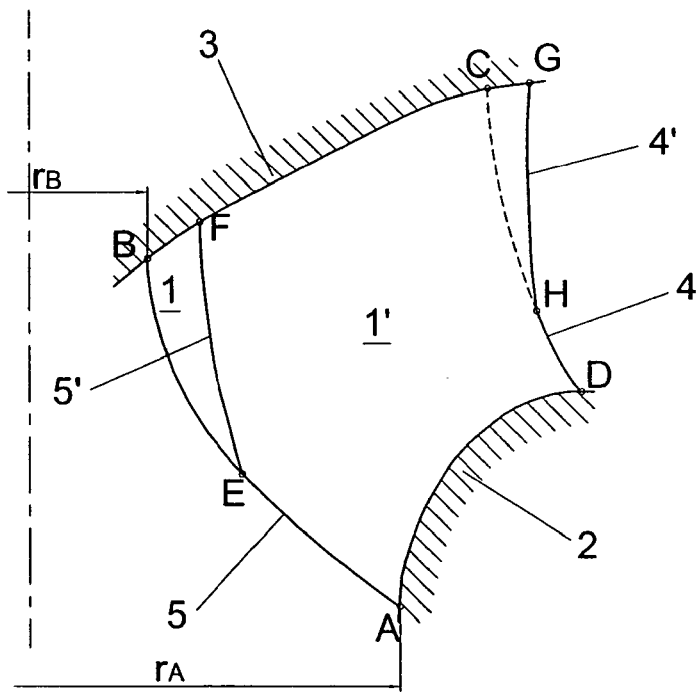
FIG. 2 shows rotor blades according to the invention of a hydraulic machine.
Figure 3:
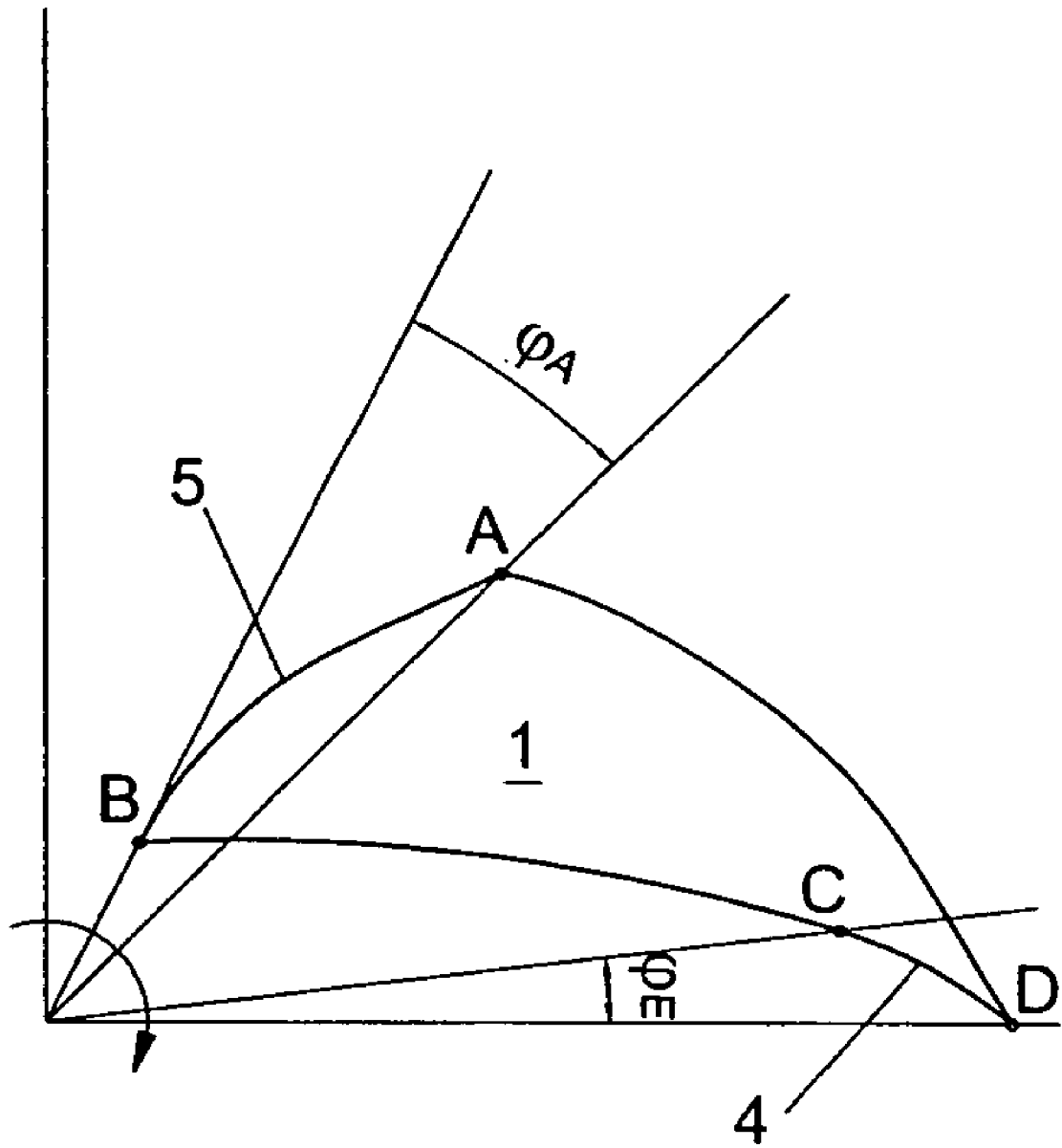
FIG. 3 shows a view of a rotor blade according to the invention in the axial direction.

The rotor blade 1 is in most cases not planar, but, instead, may basically have any desired spatial curvature, as indicated in FIG. 3, in which a view of a rotor blade 1 in the axial direction of the axis of rotation is illustrated. It can be seen that the contact points C (or G in FIG. 2) and D of the inlet edge 4 (or 4*a* of FIG. 2) of the inner cover disk 3 and at the outer cover disk 2 with respect to the axis of rotation of the hydraulic machine may have a circumferential spacing $\phi_E$, that is, they do not come to lie on a radial line through the axis of rotation with respect to the axial direction of the axis of rotation, but, instead, are arranged at a defined angle with respect to one another. The same may, of course, also apply to the contact points B (or F in FIG. 2) and A of the outlet edge 5 (or 5') of the inner 3 and outer 2 cover disk, where a circumferential spacing $\phi_A$ may be provided. For the cavitation behavior of the hydraulic machine, it is beneficial in this case if this circumferential spacing is $\phi_A$ of the contact points B (or F) and A of the outlet edge 5 (or 5') is selected so as to be greater than the circumferential spacing $\phi_E$ of the contact points C (or G) and D of the inlet edge 4 (or 4'). A preferred value for $\phi_A$ is in this case 15° or greater.

Moreover, it can be seen in FIG. 3 that, as seen in the direction of rotation indicated by the arrow, the contact points D, A at the outer cover disk 2 are arranged in front of the corresponding contact points B (or F) and C (or G) of the inner cover disk.

FIG. 2, then, illustrates diagrammatically a rotor according to the invention. The rotor blades 1 and 1' of this rotor are again arranged between an inner 3 and an outer 2 cover disk and again form a flow duct for the operating medium.

In this rotor, however, the inlet edge 4 and the outlet edge 5 of every second or third rotor blade 1 are partially drawn outward (or drawn inward, depending on the type of view) with respect to the axis of rotation of the hydraulic machine. That is to say, as before, part of the rotor blades 1 are delimited conventionally, as described in FIG. 1, that is to say by an inlet edge 4 between the contact points C and D, an outlet edge 5 between the contact points A and B and the inner 3 and outer 2 cover disk. Every second or third rotor blade 1' deviates from this delimitation. The inlet edge 4 of two adjacent rotor blades 1, 1' runs identically from the contact point D between the inlet edge 4 and the outer cover disk as far as any point H on the inlet edge 4, and, from this point H, the inlet edge 4' is drawn outward with respect to the axis of rotation, that is to say the contact point G of the inlet edge 4' of the rotor blade 1' of the inner cover disk 3 has a larger radius than the corresponding contact point C of the adjacent rotor blade 1.

What was stated above applies similarly to the outlet edge 5. The outlet edges 5 of the directly adjacent rotor blades 1, 1' are essentially congruent between a contact point A at the outer cover disk 2 and any point E on the outlet edge 5. From this point E, the outlet edge 5' of every second or third rotor blade 1' is drawn outward (or drawn inward, depending on the type of view), that is to say the contact point F of the outlet edge 5' of the rotor blade 1' of the inner cover disk 3 has a larger radius than the corresponding contact point B of the adjacent rotor blade 1.

The delimitation of part of the rotor blades 1 thus runs between the contact points C and D, which form the inlet edge 4, and the contact points A and B, which form the outlet edge 5, as in conventional blades, and the delimitation of every second or third rotor blade 1' runs between the points D, H and G, which form the inlet edge 4', and the points A, E and F, which form the outlet edge 5'.

The above description is, of course, merely by way of example. It would, of course, also be conceivable partially to draw outward only the inlet edge 4 or only the outlet edge 5 or the inlet 4 and outlet edge 5 alternately.

Furthermore, the points E and H may be arranged in any desired position on the outlet 5 or inlet 4 edge, and, in particular, in a design according to the invention, these points E and H could also coincide with the contact points A and D at the outer cover disk 2.

By means of these outlet edges 5, 5' alternately running in a different way, the rotor blades 1 can be brought very close to the axis of rotation of the hydraulic machine, that is to say the contact points B of the outlet edges 5 of the inner cover disk 3 can have very small diameters. In particular, a radius ratio $r_B/r_A$ of the outlet edge 5 of smaller than or equal to 0.2 can be achieved, which has hitherto been difficult, if not impossible.

If the outlet edge 5 is lead very close up to the axis of rotation in the region of the inner cover disk 3, problems of space and/or mounting relating to the fastening of the rotor to the shaft 7 may arise under some circumstances. In order to solve this problem, there could be provision, for example, for designing part of the rotor blades 1 or 1' as part of a sufficiently known hub cover, not illustrated here. For example, a portion of the rotor blade which is defined by the points E, B and F could be manufactured as part of the hub cover which would then be releasable together with the hub cover, from the rotor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rotor of a hydraulic machine, the machine having a plurality of rotor blades, an inner and an outer cover disk between which the rotor blades are arranged; each of the rotor blades having an inlet edge and, with respect to the flow direction, an opposite outlet edge; including
    a first contact point at least one of between the inner cover disk and the inlet edge of the blade and between the inner cover disk and the outlet edge of at least one first rotor blade, the first contact point has a radius which is larger with respect to an axis of rotation of the hydraulic machine than corresponding location contact points of a directly adjacent second rotor blade; and
    the contact points between the outer cover disk and the inlet and outlet edge of both of the first and the second rotor blades are in essentially the same radius.

2. The rotor as claimed in claim 1, wherein the inlet edges of the first and the second rotor blades of the rotor are shaped to run at least partially differently.

3. The rotor as claimed in claim 2, wherein the inlet edges of the first and the second rotor blade of the rotor are shaped to run essentially identically between their respective contact points of the inlet edge of the outer cover disk and a predeterminable point on the inlet edge, the point being between the outer and the inner cover disks.

4. The rotor as claimed in claim 1, wherein the outlet edges of the first and the second rotor blades of the rotor are shaped to run at least partially differently.

5. The rotor as claimed in claim 4, wherein the outlet edges of the first and the second rotor blades of the rotor are shaped to run essentially identically between the contact point of the outlet edge of the outer cover disk and a predeterminable point on the outlet edge, the point being between the outer and the inner cover disks.

6. The rotor as claimed in one of claims 1, wherein a ratio between the smallest radius $r_B$ of a contact point of the outlet edge with the inner cover disk of a rotor blade and the radius $r_A$ nof the contact point of the outlet edge with the outer cover disk of this rotor blade is smaller than or equal to 0.4.

7. The rotor as claimed in one of claims 1, wherein a ratio between the smallest radius $r_B$ of a contact point of the outlet edge with the inner cover disk of a rotor blade and the radius $r_A$ of the contact point of the outlet edge with the outer cover disk of this rotor blade is smaller than or equal to 0.2.

8. The rotor as claimed in claim 1, wherein the number of rotor blades of the rotor is divisible by two or three.

9. The rotor as claimed in claim 8, wherein when the number of rotor blades is divisible by two, at least one of the outlet edge and the inlet edge of every second rotor blade has a contact point at the inner cover disk with a smaller radius with respect to the axis of rotation of the rotor than the corresponding contact point of the adjacent rotor blade.

10. The rotor as claimed in claim 8, wherein when the number of rotor blades is divisible by three, at least one of the outlet edge and the inlet edge of one third of the rotor blades has a contact point at the inner cover disk with a smaller radius with respect to an axis of rotation of the rotor than the corresponding contact points of the adjacent rotor blades.

11. The rotor as claimed in claim 1, wherein the contact point between the outlet edge and the inner cover disk of at least one rotor blade is arranged below the center of the inlet edge of this rotor blade in the axial direction between the disks.

12. The rotor as claimed in claim 1, wherein with respect to the direction of rotation of the rotor, the contact points of the inlet and the outlet edges of the outer cover disk of at least one rotor blade are arranged in front of the corresponding contact points of the inlet and the outlet edge at the inner cover disk of the at least one rotor blade.

13. The rotor as claimed in claim 1, wherein with respect to the axis of rotation of the rotor, the circumferential spacing $\phi_A$ between the contact points of the outlet edge of the outer and the inner cover disk of at least one of the rotor blades is greater than the circumferential spacing $\phi_E$ between the contact points of the inlet edge of the outer and the inner cover disk of the one rotor blade.

14. The rotor as claimed in claim 13, characterized in that the circumferential spacing $\phi_A$ between the contact points (A, B, F) of the outlet edge (5, 5') of the outer (2) and the inner (3) cover disk of at least one rotor blade is greater than 10°.

15. The rotor as claimed in claim 13, characterized in that the circumferential spacing $\phi_A$ between the contact points (A, B, F) of the outlet edge (5, 5') of the outer (2) and the inner (3) cover disk of at least one rotor blade is greater than 15°.

16. A method for producing a rotor of a hydraulic machine, having a plurality of rotor blades arranged between an inner and an outer cover disk, comprising manufacturing at least one rotor blade of the rotor with at least one of an inlet and an outlet edge thereof different from an adjacent rotor blade, so that a contact point between the inner cover disk and the inlet edge and a contact point between the inner cover disk and the outlet edge of at least one of the rotor blades has a larger radius with respect to the axis of rotation of the hydraulic machine than the corresponding contact points of an adjacent one of the rotor blades, the contact points between the outer cover disk and the inlet and outlet edges of all the rotor blades having essentially the same radius.

17. The method as claimed in claim 16 wherein the rotor blades are manufactured beforehand as individual parts and are thereafter welded to the inner and outer cover disks to form the rotor.

18. A method as claimed in claim 16 wherein the rotor is at least partially cast, and the rotor blades are thereafter machined by a surface machining method.

* * * * *